US011978967B2

(12) United States Patent
Barras et al.

(10) Patent No.: US 11,978,967 B2
(45) Date of Patent: May 7, 2024

(54) UWB ANTENNA

(71) Applicant: INFINEON TECHNOLOGIES SWITZERLAND AG, Zürich (CH)

(72) Inventors: David Barras, Sierre (CH); Tatjana Asenov, Bern (CH)

(73) Assignee: INFINEON TECHNOLOGIES SWITZERLAND AG, Zürich (CH)

(*) Notice: Subject to any disclaimer, the term of this patent is extended or adjusted under 35 U.S.C. 154(b) by 0 days.

(21) Appl. No.: 17/879,905

(22) Filed: Aug. 3, 2022

(65) Prior Publication Data

US 2023/0043116 A1 Feb. 9, 2023

(30) Foreign Application Priority Data

Aug. 9, 2021 (EP) .................................... 21190379

(51) Int. Cl.
*H01Q 1/38* (2006.01)
*H01Q 5/25* (2015.01)
*H01Q 5/48* (2015.01)

(52) U.S. Cl.
CPC ................. *H01Q 5/25* (2015.01); *H01Q 5/48* (2015.01)

(58) Field of Classification Search
CPC ............ H01Q 1/27; H01Q 1/273; H01Q 1/38; H01Q 1/48; H01Q 1/50; H01Q 1/52;
(Continued)

(56) References Cited

U.S. PATENT DOCUMENTS 7,649,499 B2 * 1/2010 Watanabe .............. H05K 1/141 343/700 MS
8,390,529 B1 * 3/2013 Paulsen ................ H01Q 11/105 343/895

(Continued)

FOREIGN PATENT DOCUMENTS

CN 110350308 A 10/2019
CN 210628485 U 5/2020

(Continued)

OTHER PUBLICATIONS

Cara et al., “A Low Profile UWB Antenna for Wearable Applications: The Tripod Kettle Antenna (TKA),” 2013 7th european Conference on Antennas and Propagation (EuCAP), pp. 3156-3159.

*Primary Examiner* — Tho G Phan
(74) *Attorney, Agent, or Firm* — Merchant & Gould P.C.

(57) ABSTRACT

UWB Antenna comprising: a first substrate layer (10); a second substrate layer (20); a conductive ground layer (300) arranged on a first side of the first substrate layer and connected to a ground terminal; a first conductive layer (100) arranged between the first substrate layer (10) and the second substrate layer (20), wherein a central portion (140) of the first conductive layer (100) is connected to the feed terminal (3), wherein the first conductive layer (100) has a shape with a plurality of arms extending radially from the central portion (140), wherein the plurality of arms (110, 120, 130) is connected in its distal portion (111, 121, 131) with the ground layer (300); a second conductive layer (200) arranged on a second side of the second substrate layer (20, 20'), wherein the layers (10, 20, 100, 200, 300) are realised with a multilayer circuit board.

15 Claims, 4 Drawing Sheets

(58) Field of Classification Search
CPC ........ H01Q 25/00; H01Q 25/005; H01Q 3/24; H01Q 5/25; H01Q 5/48; H01Q 9/04; H01Q 9/0414; H01Q 9/0421
See application file for complete search history.

(56) References Cited

U.S. PATENT DOCUMENTS

| | | | | |
|---|---|---|---|---|
| 9,030,358 | B2 * | 5/2015 | Chou | H01Q 5/371 343/702 |
| 9,252,499 | B2 * | 2/2016 | Chen | H01Q 9/0457 |
| 9,496,613 | B2 * | 11/2016 | Sawa | H01Q 9/045 |
| 11,309,638 | B1 * | 4/2022 | Rodriguez De Luis | H01Q 1/38 |
| 11,362,413 | B2 * | 6/2022 | Plet | H01Q 1/526 |
| 11,394,121 | B2 * | 7/2022 | Farkas | H01Q 5/25 |
| 2014/0225797 | A1 | 8/2014 | Kletsov et al. | |
| 2020/0194889 | A1 | 6/2020 | Hallivuori | |

FOREIGN PATENT DOCUMENTS

| | | | |
|---|---|---|---|
| JP | S52108755 | A | 9/1977 |
| JP | S5713162 | B2 | 3/1982 |

* cited by examiner

UWB ANTENNA

CROSS-REFERENCE TO RELATED APPLICATION(S)

This application claims priority benefit of Application No. 21190379.4 filed in Europe on Aug. 9, 2021, and which application is hereby incorporated by reference in its entirety. To the extent appropriate, a claim of priority is made to the above-disclosed application.

TECHNICAL FIELD

The present invention relates to an UWB antenna.

PRIOR ART

The ultra-wideband (UWB) technology is on the rise and there are more and more UWB applications. Especially, in the field of wearables UWB communication is often desired. However, in the vicinity of the body, the characteristics of most common UWB antennas deteriorate significantly which leads either to a bad connection quality or a higher transmission power. A classical dipole printed on a PCB would emit the electrical field mainly parallel to the PCB and thus normally parallel to the surface of the body (if the PCB is arranged parallel to the body), since the body absorbs the electrical field. It was found out that an antenna is much less sensitive to the vicinity of the body, if the electrical field emitted by the antenna is substantially perpendicular to the surface of the body (vertically polarized). The dimensions of the vertically polarized antennas, e.g. dipole, monopole based antennas etc, are constrained by the corresponding wavelengths. This represents a challenge in designing a compact vertically polarized UWB antennas for modern wireless systems.

Therefore, low profile UWB antennas realized by using various slot shaped antenna and optimizing monopole-based designs and different loading techniques are proposed to overcome the above problems. For example, CN110350308B, CN210628485U, JPS52108755A and JPS5713162B2 propose low-profile UWB antenna solutions with three-dimensional multiple metallic differently shaped plates. Also, the article with the title “A low profile UWB Antenna for wearable applications: The tripod kettle antenna (TKA)” by the authors Cara et al. published in 2013 7th European Conference on Antennas and Propagation (EuCAP) discloses an assembly of metallic plates to obtain an UWB antenna with good characteristics in the vicinity of the body. However, these low-profile vertically polarized UWB antennas are demanding to manufacture and assemble. In addition, the available solutions are less robust to damaging while in use. Also, their miniaturization is challenging.

US2014/0225797 discloses a planar dipole UWB antenna realised in a multilayer PCB design. However, to obtain a vertical polarization with respect to the surface of the body, the PCB plane must be arranged vertically to the surface of the body which is often challenging.

US2020/0194889A1 discloses a multiband antenna which allows also the emission of UWB signals realized in a multilayer PCB design.

Multilayer PCB designs have the advantage of being manufactured much easier, but their horizontal polarization in the plane of the circuit board is not advantageous in close vicinity with a body.

BRIEF SUMMARY OF THE INVENTION

It is the object of the invention to provide UWB antenna which can be easily manufactured and miniaturized and provides good and unaffected antenna characteristics (radiation patterns, input reflection coefficient or input impedance) in vicinity of a body or metallic structures.

According to the invention, this object is solved by the UWB antenna according to claim 1.

By realizing the tripod kettle antenna in a multilayer circuit board, an UWB antenna with very good antenna characteristics in the vicinity of the body has been created which can be easily manufactured with common PCB manufacturing technologies, which is robust, and which can be miniaturized without any problems. The reduced complexity of the manufacturing process makes the antenna also cheaper than the state-of-the-art antennas at the same or better antenna characteristics and with smaller dimensions. Even if the antenna was realised in a circuit board, the UWB antenna could yield mainly a vertical polarization with respect to the antenna plane so that the antenna has very good characteristics in the vicinity of the body, if placed with the antenna plane parallel to the body surface. In addition, this solution allows to integrate the antenna directly into circuit boards of the electronic devices into which it shall be built in which further facilitates the manufacturing.

The dependent claims refer to further advantageous embodiments.

It was further found out that realizing the second conductive layer as with a floating potential not connected to the first conductive layer as in the tripod kettle antenna of the state of the art significantly improved the characteristics of the multi-layer circuit board UWB antenna.

It was found out that the input impedance over the full frequency band of the antenna could be improved, if one of the arms has a higher number of interlayer connectors than the other arms. Thus, the input impedance can be easily adapted by adapting the number of interlayer connectors.

It was found out that the correct arrangement of the second conductive layer over the first conductive layer is very important for obtaining the (linear) vertical polarization. The second conductive layer is therefore arranged such over the first conductive layer that the antenna has a linear vertical polarization. For the realization of the first conductive layer with three arms and the second conductive layer with an ellipsoidal shape, the UWB antenna obtains a good linear vertical polarization, when the shorter ellipse-axis is aligned with the radial central axis of a first arm of the first conductive layer, while the longer ellipse-axis is arranged off-set from the central point of the first conductive layer towards the second and third arm.

Other embodiments according to the present invention are mentioned in the appended claims and the subsequent description of UWB antenna.

BRIEF DESCRIPTION OF THE DRAWINGS

In the drawings, the same reference numbers have been allocated to the same or analogue element.

DETAILED DESCRIPTION OF AN EMBODIMENT OF THE INVENTION

Other characteristics and advantages of the present invention will be derived from the non-limitative following description, and by making reference to the drawings and the examples.

The antenna according to the invention is an UWB antenna. An UWB antenna whose frequency bandwidth (band) is larger than 500 MHz or whose fractional band is greater than 0.2. A frequency band of an antenna comprises all emission frequencies in a connected frequency band at which the voltage standing wave ratio (VSWR) is smaller than two. The frequency band of the antenna has a lower band frequency indicating minimum frequency of the frequency band of the antenna and an upper band frequency indicating the maximum frequency of the frequency band of the antenna. That is that the VSWR between the lower band frequency and the upper band frequency is always smaller than 2 for all frequencies in between. The center frequency of the frequency band of the antenna is the frequency in the middle between the lower and upper band frequency. The fractional band is defined as the difference between the upper and lower band frequency divided by the center frequency of the frequency band of the antenna. The lower band frequency is preferably larger than 1 Gigahertz (GHz), preferably larger than 2 GHz, preferably larger than 3 GHz, preferably larger than 4 GHz, preferably larger than 5 GHz, preferably larger than 6 GHz. The upper band frequency is preferably smaller than 15 GHz, preferably smaller than 10 GHz, preferably smaller than 9.5 GHz.

Figure 1:
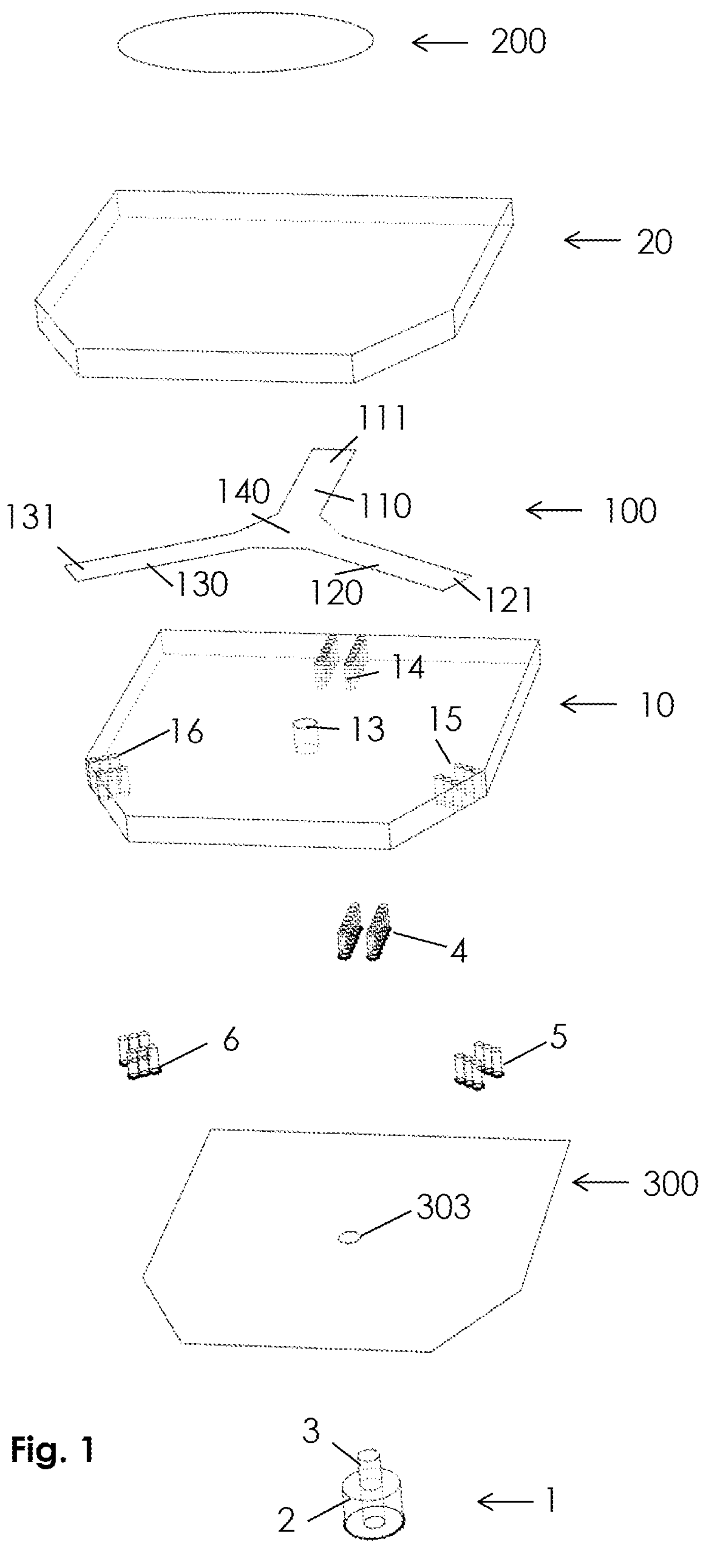
FIG. 1 shows an exploded view of a first embodiment of the UWB antenna according to the invention.
Figure 2:
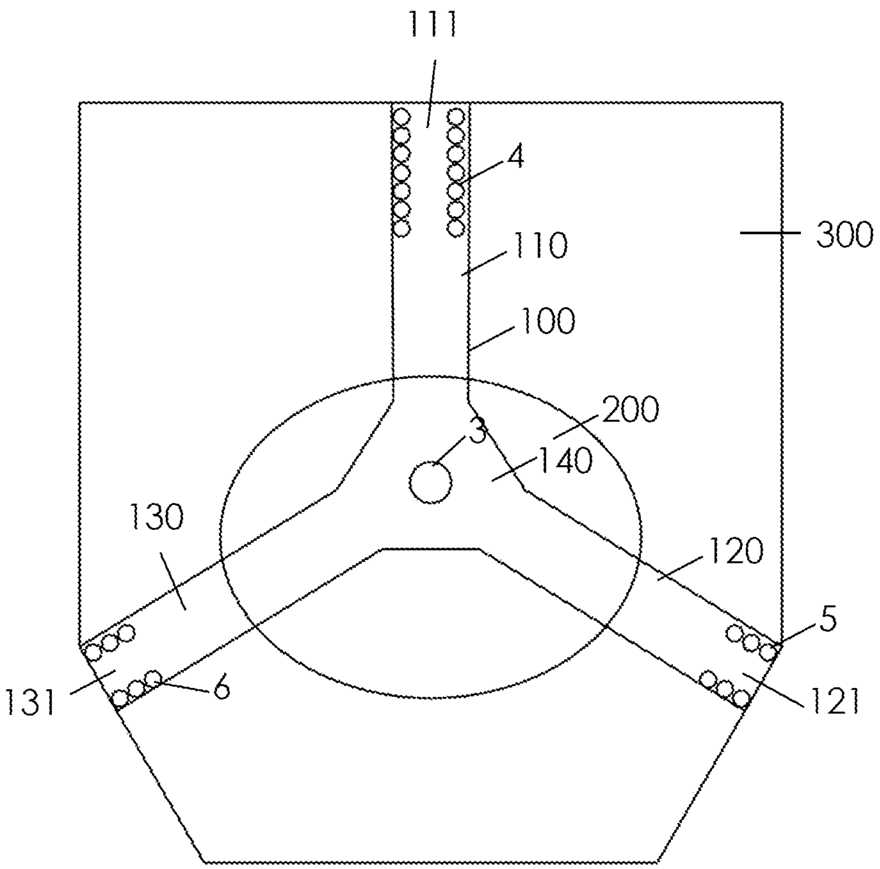
FIG. 2 shows a transparent top view of the antenna showing the ground layer, the interlayer connectors, the first conductive layer and the second conductive layer.

FIGS. 1 and 2 show a first embodiment of the antenna according to the invention.

The embodiment of the antenna according to the invention comprises a first substrate layer 10, a second substrate layer 20, a first conductive layer 100 and a second conductive layer 200, a ground layer 300, a feed terminal 3 and a ground terminal 2.

Just for describing the antenna better and without limiting the invention, we define some directions. A first direction, a second direction and a third direction are arranged perpendicular to each other, i.e. span a cartesian coordinate system. The second direction and the third direction span an antenna plane. All directions extending in the antenna plane shall be called plane direction. The first direction or the axial direction is perpendicular to the antenna plane or any plane direction. The antenna plane shall just define the plane perpendicular to the first direction without defining any special position of the antenna plane in the first direction. The first direction shall just define the direction without defining any position of the first direction in the second or third direction. The terms above and below shall indicate a direction within the first/axial direction. A central axis shall be defined by an axis extending in the first direction through the antenna at a fixed position in the antenna plane. Thus, the central axis is perpendicular to the antenna plane. A central point of any layer (first conductive layer 10, second conductive layer 200, ground layer 300, first substrate layer 10, second substrate layer 20) shall be defined as the point in which the central axis intersects with the layer. A radial direction is defined as a (plane) direction extending radially to the central axis.

The first substrate layer 10 is a dielectric material and/or an electrically non-conducting material. Substrate materials can be for example FR-4, RO6006 or TMM6. The first substrate layer 10 is arranged parallel to the antenna plane. The first substrate layer 10 has a first side and an opposed second side. The first side and/or the second side of the first substrate layer 10 are arranged parallel to the antenna plane. The first substrate layer 10 has preferably a constant thickness over the antenna plane (not considering minor differences in thickness caused by producing the conductive layers 300, 100 on the first and/or second side of the first substrate layer 100. The first substrate layer 10 has preferably at least one peripheral side connecting the first and the second side of the first substrate layer 10. The number of peripheral sides could depend on the form of the antenna which will be described later in more detail, if the first substrate layer 10 is just for the antenna. However, the first substrate layer 10 could also extend beyond the antenna and support further circuitry, if the antenna is integrated in the circuit board of the electronic device in which it shall be used.

The second substrate layer 20 is a dielectric material and/or an electrically non-conducting material. Substrate materials can be for example FR-4, RO6006 or TMM6. The second substrate layer 20 is arranged parallel to the antenna plane. The second substrate layer 20 has a first side and an opposed second side. The first side and/or the second side of the second substrate layer 20 are arranged parallel to the antenna plane. The second substrate layer 20 is arranged such above the first substrate layer 10 that the second side of the first substrate layer 10 faces towards the first side of the second substrate layer 20. The first side of the first substrate layer 10 faces away from the second substrate layer 20. The second side of the second substrate layer 20 faces away from the first substrate layer 10. The second substrate layer 20 has in the shown embodiment the same thickness as the first substrate layer 10. However, it is also possible to have a different substrate thickness for the first and second substrate layer 10, 20. The second substrate layer 20 has preferably a constant thickness over the antenna plane (not considering minor differences in thickness caused by producing the conductive layers 100, 200 on the first and/or second side of the second substrate layer 20). The second substrate layer 20 has preferably at least one peripheral side connecting the first and the second side of the second substrate layer 20. The number of peripheral sides depend on the form of the antenna which will be described later in more detail. Preferably, the form of the second substrate layer 20 corresponds to the form of the first substrate layer 10. However, it is also possible that the form of the second substrate layer 20 is different than the form of the first substrate layer 10, for example smaller. The form of the second substrate layer 20 should cover at least the second conductive layer 200.

The ground layer 300 is a conductive layer. The ground layer 300 is arranged on the first side of the first substrate layer 10. The ground layer 300 has first the function to shield the antenna versus the body, thus in the direction below the ground layer 300. In addition, the ground layer 300 has the function to establish an electric field between the first conductive layer 100 and the ground layer 300 so that the direction of the electric field of the antenna is vertically polarised, i.e. extends perpendicular to the antenna plane. The bigger the ground layer 300 the better is the shielding effect. Preferably, the ground layer 300 covers at least the surface covered by the first conductive layer 100 and/or covered by the second conductive layer 200. Preferably, the ground layer 300 covers at least the surface included when connecting the distal portions 111, 121, 131 of the first conductive layer 100. Especially, when the first substrate layer 10 holds just the circuitry for the antenna itself, the ground layer 300 covers preferably substantially the full first side of the first substrate layer 10. The ground layer 300 is connected with the ground terminal 2 of the antenna.

The first conductive layer 100 is arranged between the first substrate layer 10 and the second substrate layer 20 or between the first side of the second substrate layer 20 and the second side of the first substrate layer 10. The first conductive layer 100 is made out of a conductive material, for example copper. The first conductive layer 100 is arranged parallel to the antenna plane. The first conductive layer 100 is arranged on the second side of the first substrate layer 10 and/or on the first side of the second substrate layer 20. The first conductive layer 100 is preferably formed on the second side of the first substrate layer 10 (and/or on the first side of the second substrate layer 20), preferably by circuit board manufacturing techniques, preferably by printed circuit board (PCB) manufacturing techniques. The thickness of the first conductive layer 100 is preferably constant over the antenna plane.

The first conductive layer 100 comprises a plurality of arms 110, 120, 130 extending from a central portion 140. Preferably, the arms 110, 120, 130 extend in a radial direction from the central portion 140, from the central point of the first conductive layer 100 and/or from the central axis of the antenna. The plurality of arms 110, 120, 130 comprises at least two, preferably at least three arms. An optimized omnidirectional radiation characteristic was found with three arms. However, the antenna showed also reasonable results for omnidirectional radiation patterns with four arms or more arms. For other radiation characteristics, the optimal radiation pattern might be achieved with another number of arms. Each arm has preferably the same width. The width of each arm remains preferably constant over most or all of the longitudinal extension of the arm (in the radial direction). In the shown embodiment, the first arm is a longer than the second and third arm. Depending on the antenna characteristics desired, it is also possible to realize the plurality of arms with the same length. However, it is also possible to build a realisation with a changing width over the longitudinal extension of the arms. The plurality of arms 110, 120, 130 extending radially to the central portion 140, preferably to the central point of the first conductive layer 100 are equally distributed around the central portion 140 or the central point, i.e. each two neighbouring arms have the same angular distance between them. For the preferred solution with three arms 110, 120, 130, the angular distance is 120°. Each or some or one of the arms could bifurcate at a certain distance from the central portion into a plurality of sub-arms, e.g. similar to a tree or could change the direction. Each arm (or sub-arm) comprises a distal portion 111, 121, 131 arranged at the distal end of the arm opposed to the central portion 140 or to the central point. The central portion 140 is preferably the surface where the plurality of arms 110, 120, 130 intersect. Preferably, the central portion 140 is smaller than the second conductive layer 200. Here the central portion 140 has a triangular form. However, other forms of the central portion 140 are also possible.

The first conductive layer 100 is connected with the feed terminal 3 of the antenna. Preferably, the central portion 140 or the central point of the first conductive layer 100 is connected with the feed terminal 3 of the antenna and/or provides the feed point of the antenna. Preferably, the central portion 140 or the central point is connected with an interlayer connector to the feed terminal 3. An interlayer connector according to this invention is any means which creates a conductive connection through at least one substrate layer. The interlayer connector is preferably a via as used in circuit boards. However, also other interlayer connectors are possible. Preferably, the ground layer 300 comprises a recess around the interlayer connector and/or the feed terminal 3 so that the feed terminal 3 is not conductively connected with the ground layer 300 in the central portion of the antenna. The interlayer connector is preferably a via. The interlayer connector could directly constitute the feed terminal 3. In a coaxial connector 1 of the antenna as shown in FIG. 1, the feed terminal 3 and the ground terminal 2 of the antenna are arranged parallel to the axial direction, preferably coaxially to the axial direction. However, it is also possible to use different connection technologies with differently arranged feed terminal 3 and ground terminal 2 of the antenna. For example, when the feed and ground connection shall come from one planar direction, a microstrip line could connect the interlayer connector connecting (the central point/portion 140 of) the first conductive layer 100. Preferably, a further substrate layer is arranged between the ground layer 300 and the microstrip line so that the ground layer 300 must not be interrupted for the microstrip line. To shield the microstrip line, preferably ground conductor surfaces are arranged at both sides of the microstrip line on the additional conductor to shield the microstrip line. The microstrip line could then be led to one peripheral side of the antenna or, if the antenna is integrated into a larger PCB, directly to the electronics creating the signal to be emitted with the UWB antenna or receiving the signal received at the UWB antenna, i.e. to the transmitter/receiver/transceiver. In this case the feed connector and the ground connector would be the feed and ground conductor on the PCB connecting the antenna with the transmission electronics. Obviously, there are many other connection possibilities. It would also be possible to connect the feed point on the second side of the first substrate layer 10 directly with a microstrip line on the second side of the first substrate layer 10. This would make the construction of the antenna easier but could lead to a deterioration of the antenna characteristics due to the interference of the microstrip line. As will be clear for the person skilled in the art, there are many ways of arranging the feed and ground connector in the antenna and the invention shall not be limited to one connector technology.

The distal portion 111, 121, 131 of each arm 110, 120, 130 is connected with an interlayer connector 4, 5, 6 to the ground layer 300. Preferably, the distal portion 111, 121, 131 of each arm 110, 120, 130 is connected to the ground layer 300 with a plurality of interlayer connectors 4, 5, 6, preferably vias. Thus, the feed signal from the feed terminal 3 is conducted from the feed point or the central point of the first conductive layer 100 radially through the arms 110, 120, 130 and then through the interlayer connectors 4, 5, 6 in the distal portions 111, 121, 131 back in the ground layer 300 from where it is conducted back into the ground terminal. In a preferred embodiment, the different distal portions 111, 121, 131 have a different number of interlayer connectors 4, 5, 6. Preferably, the first arm 110 has a first number of vias 4, while the second arm 120 and/or the third arm 130 have a second number of vias 5, 6. Preferably, the first number of vias 4 is larger than the second number of vias 5, 6. The inventors found out that the input impedance of the antenna can be configured quite well with the asymmetric distribution of vias and/or with the number of vias in the distal portions 111, 121, 131 of the different arms 110, 120, 130. The interlayer connectors 4, 5, 6 are realised preferably by vias, but could also be realised by other types of interlayer connectors. For example, a conductive layer on the peripheral side of the first substrate layer 10 could connect the distal portions 111, 121, 131 with the ground layer 300.

The second conductive layer 200 is made of a conductive material, preferably copper. The second conductive layer 200 is arranged on the second side of the second substrate layer 200. It was found out that the antenna characteristics were improved, when the second conductive layer 200 is electrically floating or electrically isolated, i.e. is not conductively connected to any other conductive layer (ground layer 300 or first conductive layer 200). However, it would also be possible to connect the second conductive layer 200 to the first conductive layer 100. The second conductive layer 200 is arranged above the first conductive layer 100, preferably above the central portion 140 of the first conductive layer 100. The second conductive layer 200 is preferably arranged such over (the central portion 140 of) the first conductive layer 100 that the UWB antenna emits a linear vertically polarized signal. The UWB antenna emits a linear vertically polarized signal, when it emits a vertically polarized signal for more than 50%, preferably more than 60%, preferably more than 70%, preferably more than 80%, preferably more than 90% of the frequency bandwidth of the UWB antenna. The correct arrangement/alignment of the second conductive layer 200 over the first conductive layer for providing a vertically polarized signal depends largely on the number of arms 110, 120, 130, the dimensions of the arms 110, 120, 130 and the shape and the position of the second conductive layer 200 with respect to the first conductive layer 100. Preferably, a central point of the shape of the second conductive layer 200 is arranged over the central point of the first conductive layer 100 and/or at least one geometrical axis of the shape of the second conductive layer 200 is aligned with at least one arm 110 of the first conductive layer 100. The second conductive layer 200 is preferably larger than the central portion 140 so that the second conductive layer 200 covers preferably (at least) the central portion 140 of the first conductive layer 100. Thus, the second conductive layer 200 covers preferably the central portion 140 and the beginning of (at least some) arms 110, 120, 130 of the first conductive layer 100. The second conductive layer 200 is preferably designed such that most or all of the arms 110, 120, 130 extend beyond the second conductive layer 100 (in the antenna plane). The second conductive layer 200 over the central portion 140 of the first conductive layer 100 increases the vertical polarity of the antenna and thus improves its uses in vicinity of the body. It was further found out that the arrangement of the second conductive layer 200 a bit offset of the central axis improved the characteristics of the antenna. Instead of arranging the form of the second conductive layer 200 centrally over the central axis of the antenna, it is moved offset from the first arm 110 towards the second 120 and third arm 130. Here an ellipsoidal shape of the second conductive layer 200 was used with the shorter ellipse axis extending in the direction of the first arm 110. However, also other shapes of the second conductive layer 200 showed good results like a triangular shape, a circular shape or any other shape.

The ground layer 300, the first substrate layer 10, the first conductive layer 100, the second substrate layer 20 and the second conductive layer 200 are stacked in this order (from the bottom to the top). This stack is realised according to the invention with a multilayer circuit board, i.e. a circuit board comprising more than one substrate layer and/or more than two conductive layers. The multilayer circuit board can be realised in many ways. The multilayer circuit board can be a multilayer a classic PCB with two substrate layers and 3 conductive layers. It is however also possible that a two-sided PCB is used for manufacturing the ground layer, the first substrate layer 10 and the first conductive layer 100, while the second substrate layer 20 with the second conductive layer 200 on its second side is bonded (with its first side) on the second side of the first substrate layer 10, i.e. on the two-sided PCB. There are also new PCB technologies which print the multilayer circuit board with an additive manufacturing technology which prints the substrate layers and the conductive layers in the same printing process. Instead of using a PCB, also other circuit board technologies could be used to realise the antenna in the multilayer circuit board.

The described antenna can be easily realised in a circuit board, i.e. in a flat arrangement and nevertheless emits an electrical field whose main polarity is vertical to the antenna plane and thus often vertical to the body. Thus, the antenna can be manufactured easily, is robust and has superior antenna characteristics in the vicinity of a body, when the antenna plane, i.e. the circuit plane is arranged parallel to the body. This improves the signal quality and reduces the transmission power for the antenna. Even when using standard substrate thicknesses, the antenna provides very a good performance and vertical polarization. It was further found out that the lower band frequency of the antenna could be determined by the shape and dimensions of the first conductive layer, while the bandwidth or the upper band frequency was determined rather by the shape and size and positioning of the second conductive layer 200. This facilitates the design of the antenna for special frequency bands.

The antenna can be realised as an electronic component as shown in the first embodiment, which is connected to an electronic device, preferably on top of a circuit board of the electronic device. This can be realised for example as shown in FIG. 1 by the coaxial connector 1 which can be connected to a corresponding coaxial connector on the circuit board of the electronic device. However, it is also possible to integrate the antenna directly in the circuit board of the electronic device. If the electronic device comprises a multilayer circuit board, the antenna can be realised in the multiple layers of the circuit board of the electronic device. If circuit board of the electronic devices comprises more than two substrate layers, multiple substrate layers of the circuit board of the electronic device can form together the first substrate layer (without conductive portions in between in the region of the antenna) and other multiple substrate layers of the circuit board of the electronic device can form together the second substrate layer (without conductive portions in between in the region of the antenna). Thus, the antenna can be integrated in the design of the circuit board. Also, a mixed approach is possible in which the ground layer 300, the first substrate layer 10 and the first conductive layer 100 is realised with the circuit board of the electronic device and the second substrate layer 20 and the second conductive layer 200 are realized as electronic component added on top of the circuit board of the electronic device in the region of the antenna.

The antenna of the first embodiment is optimized for an arrangement in which the ground layer 300 faces towards the body and the second conductive layer 200 faces away from the body. This might be fine for electronic devices whose orientation to the body are well-defined like a smart watch or a smart glass or any other wearable with a well-defined wearing position. However, for other devices like for example a flat badge which might be worn with two different sides facing the body, it is proposed to use a system comprising two antennas described above. The first antenna is arranged with its antenna plane parallel to the antenna plane of the second antenna, but with the ground layers 300 of the two antennas facing each other and the second conductive layers 200 facing away from each other. With such a two-antenna system, there is always one of the two antennas shielded from the body with an optimized antenna performance. The system could comprise a transceiver which is configured to select the antenna of the two with the better receive signal to save power. Other methods for selecting the best antenna can be used such as input impedance sensing. In this case, each of the two antennas has preferably its own feed terminal 3. One common ground terminal 2 could be used or each antenna could use its own ground terminal 2. Alternatively, it is also possible to send the UWB signal with both antennas so that at least one of the two antennas provides a good communication channel. In this case, both antennas could use one common ground terminal 2 and/or one common feed terminal 3. But each antenna could also a use a separate feed terminal 3 and/or ground terminal 2.

Figure 3:
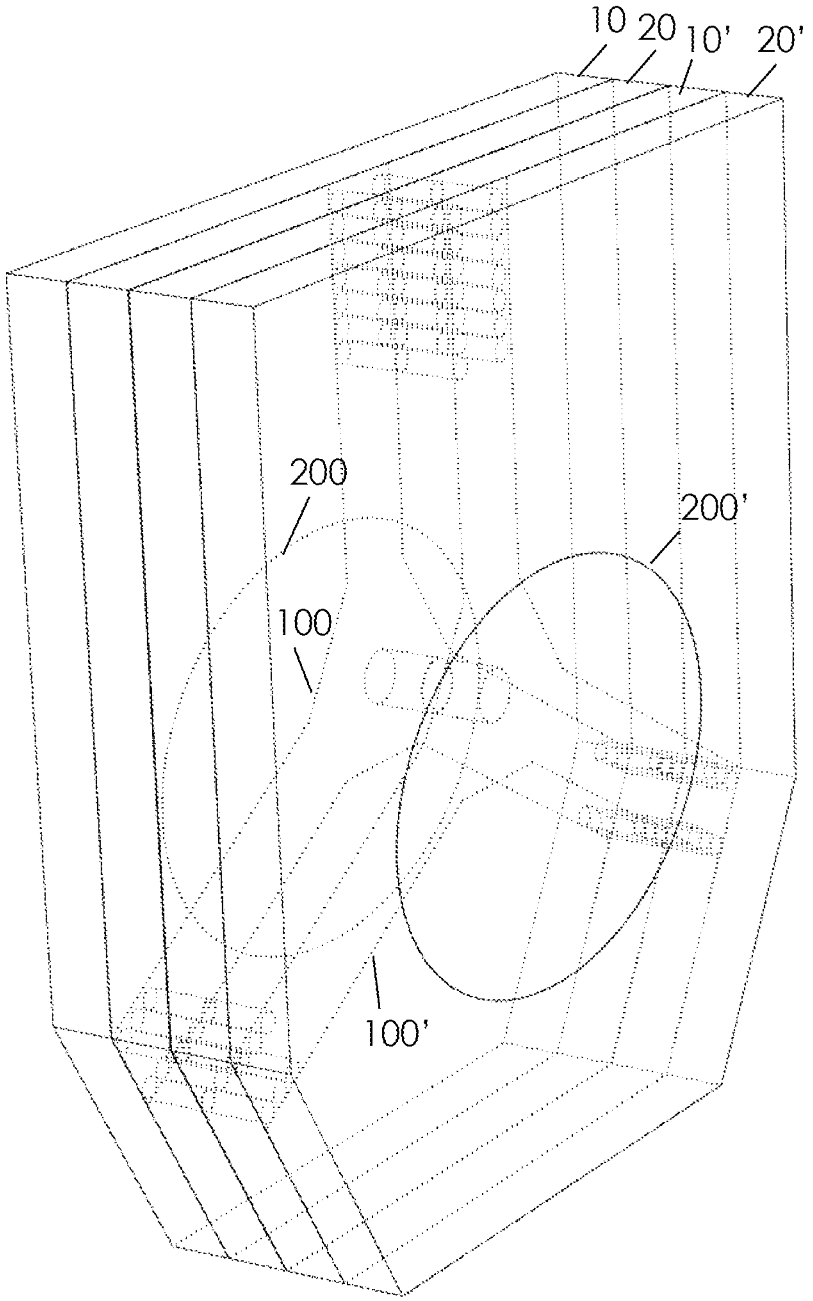
FIG. 3 shows a first embodiment of a system of two antennas according to the invention.

FIG. 3 shows a first example for such a system. The two antennas are arranged coaxially, i.e. the central axis of the first antenna corresponds to the central axis of the second antenna. This yields a stack with the following order: the second conductive layer 200 of the first antenna, the second substrate layer 20 of the first antenna, the first conductive layer 100 of the first antenna, the first substrate layer 10 of the first antenna, the ground layer of the first antenna, the ground layer 300 of the second antenna, the first substrate layer 10 of the second antenna, the first conductive layer 100 of the second antenna, the second substrate layer 20 of the second antenna, and the second conductive layer 200. If the feed terminal is still provided through the first substrate layer 10, two additional substrate layers might be arranged between the two ground layers of the two antennas, wherein between the two additional substrate layers a microstrip line is arranged (shielded by two ground plates at the respective sides) to feed the feed signal through the additional substrate layer and the first substrate layer 10, 10' to the respective feed point of the first conductive layer 100, 100' of the respective antennas. If another feed solution is found, one common ground layer could be used for the two antennas. It is obviously also possible to have the two antennas arranged parallel to each other, but off-axis. That is that the central axes of the two antennas are (parallel but) distant to each other (not coaxial).

Figure 4:
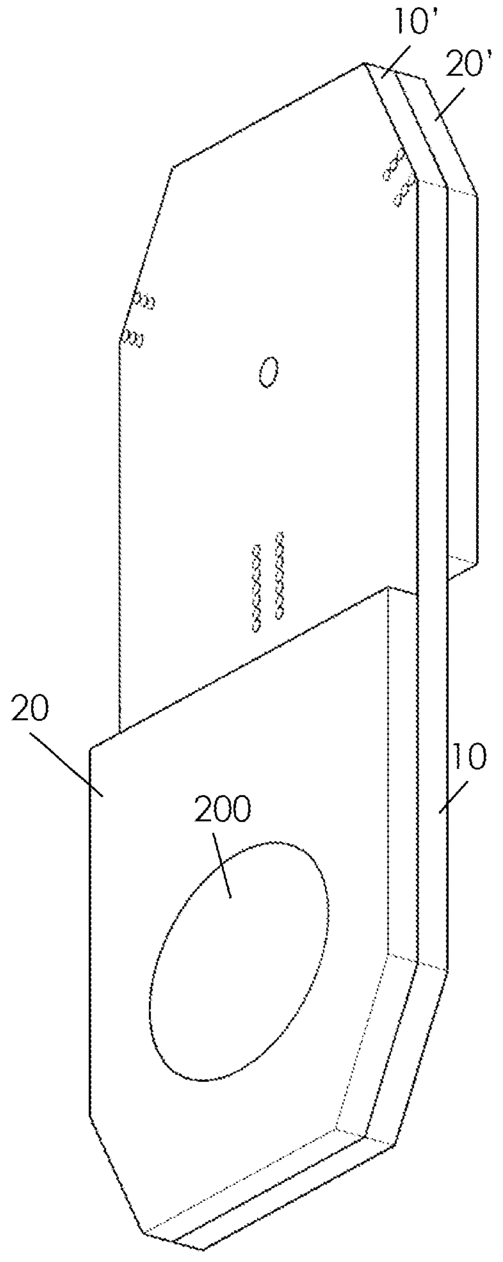
FIG. 4 shows a second embodiment of a system of two antennas according to the invention.

FIG. 4 shows such an off-axis embodiment. The two central axis of the two antennas are so far away that the two antennas do not overlap anymore. This allows that the first substrate layer 10 of the first antenna is realized longer in the direction of the second antenna where the first substrate layer 10 is used as the first substrate layer 10' of the second antenna, just with inverted sides. So, the same substrate layer 10 or 10' comprises on the same side in the region of the first antenna the ground plate 300 and in the region of the second antenna the first conductive layer 100, and on the opposite same site the first conductive layer 100 of the first antenna in the region of the first antenna and the ground layer 300 of the second antenna in the region of the second antenna. This reduces the thickness of the two-antenna system but increases its dimensions in the antenna plane. The first antenna has the second substrate layer 20 with the second conductive layer 200 on top of the first conductive layer 100 of the first antenna, while the second antenna has the second substrate layer 20' with its second conductive layer 200' on top of the first conductive layer of the second antenna.

It should be understood that the present invention is not limited to the described embodiments and that variations can be applied without going outside of the scope of the claims.

We claim:

1. A UWB antenna comprising:

a feed terminal, a ground terminal, a first substrate layer with a first side and an opposed second side, a second substrate layer with a first side and an opposed second side, wherein the second substrate layer is arranged above the first substrate layer such that the second side of the first substrate layer faces the first side of the second substrate layer, a conductive ground layer arranged on the first side of the first substrate layer and connected to the ground terminal, a first conductive layer arranged between the first substrate layer and the second substrate layer, wherein a central portion of the first conductive layer is conductively connected to the feed terminal, wherein the first conductive layer has a shape with a plurality of arms extending radially from the central portion in the plane of the first conductive layer, wherein each of the plurality of arms is connected in its distal portion with the ground layer by interlayer connectors, a second conductive layer arranged on the second side of the second substrate layer, wherein the first substrate layer, the second substrate layer, the first conductive layer, the second conductive layer and the ground layer are realized with a multilayer circuit board.

2. The UWB antenna according to claim 1, wherein the interlayer connectors are vias.

3. The UWB Antenna according to claim 2, wherein the number of vias connecting the distal portion of a first arm with the ground layer is larger than the number of vias connecting the distal portion of the at least one other arm.

4. The UWB antenna according to claim 1, wherein the connection between each distal portion of the plurality of arms of the first conductive layer to the ground layer is realized by a plurality of vias.

5. The UWB antenna according to claim 1, wherein all arms of the plurality of arms are arranged with the same angular distance between them.

6. The UWB antenna according to claim 1, wherein the plurality of arms comprises three arms and/or the angular distance between the arms is 120°.

7. The UWB antenna according to claim 1, wherein the second conductive layer is arranged over the first conductive layer such that the UWB antenna emits a linear vertically polarized signal.

8. The UWB antenna according to claim 1, wherein the arms extend beyond the second conductive layer.

9. The UWB antenna according to claim 1, wherein the second conductive layer has the form of an ellipse.

10. The UWB antenna according to claim 1, wherein the second conductive layer is arranged above the first conductive layer such that it covers at least the central portion of the first conductive layer.

11. The UWB antenna according to claim 1, wherein the second conductive layer is arranged off-set with respect to the central portion such that the second conductive layer is moved away from a first arm and towards a second arm and a third arm.

12. The UWB antenna according to claim 1, wherein the ground layer is arranged under the first conductive layer such that the ground layer extends in the plane of the ground layer up to the distal portions of the arms of the first conductive layer.

13. The UWB antenna according to claim 1, wherein the central portion of the first conductive layer is connected with an interlayer connector extending through the first substrate layer to the feed terminal.

14. A system comprising a first antenna and a second antenna, each of the first antenna and the second antenna comprising:

a feed terminal;

a ground terminal; and layers including:

a first substrate layer with a first side and an opposed second side, a second substrate layer with a first side and an opposed second side, wherein the second substrate layer is arranged above the first substrate layer such that the second side of the first substrate layer faces the first side of the second substrate layer;

a conductive ground layer arranged on the first side of the first substrate layer and connected to the ground terminal, a first conductive layer arranged between the first substrate layer and the second substrate layer, wherein a central portion of the first conductive layer is conductively connected to the feed terminal, wherein the first conductive layer has a shape with a plurality of arms extending radially from the central portion in the plane of the first conductive layer, wherein each of the plurality of arms is connected in its distal portion with the ground layer by interlayer connectors, a second conductive layer arranged on the second side of the second substrate layer, wherein the first substrate layer, the second substrate layer, the first conductive layer, the second conductive layer and the ground layer are realized with a multilayer circuit board, and wherein the first antenna is arranged with respect to the second antenna such that the layers of the first antenna are parallel to the layers of the second antenna and such that a stacking direction of the layers of the first antenna is opposed to the stacking direction of the layers of the second antenna.

15. The system according to claim 14, wherein the first substrate layer of the first antenna and the first substrate layer of the second antenna are arranged in the same plane and form one integral substrate layer structurally connecting the first and second antenna.

* * * * *